Figure 1:
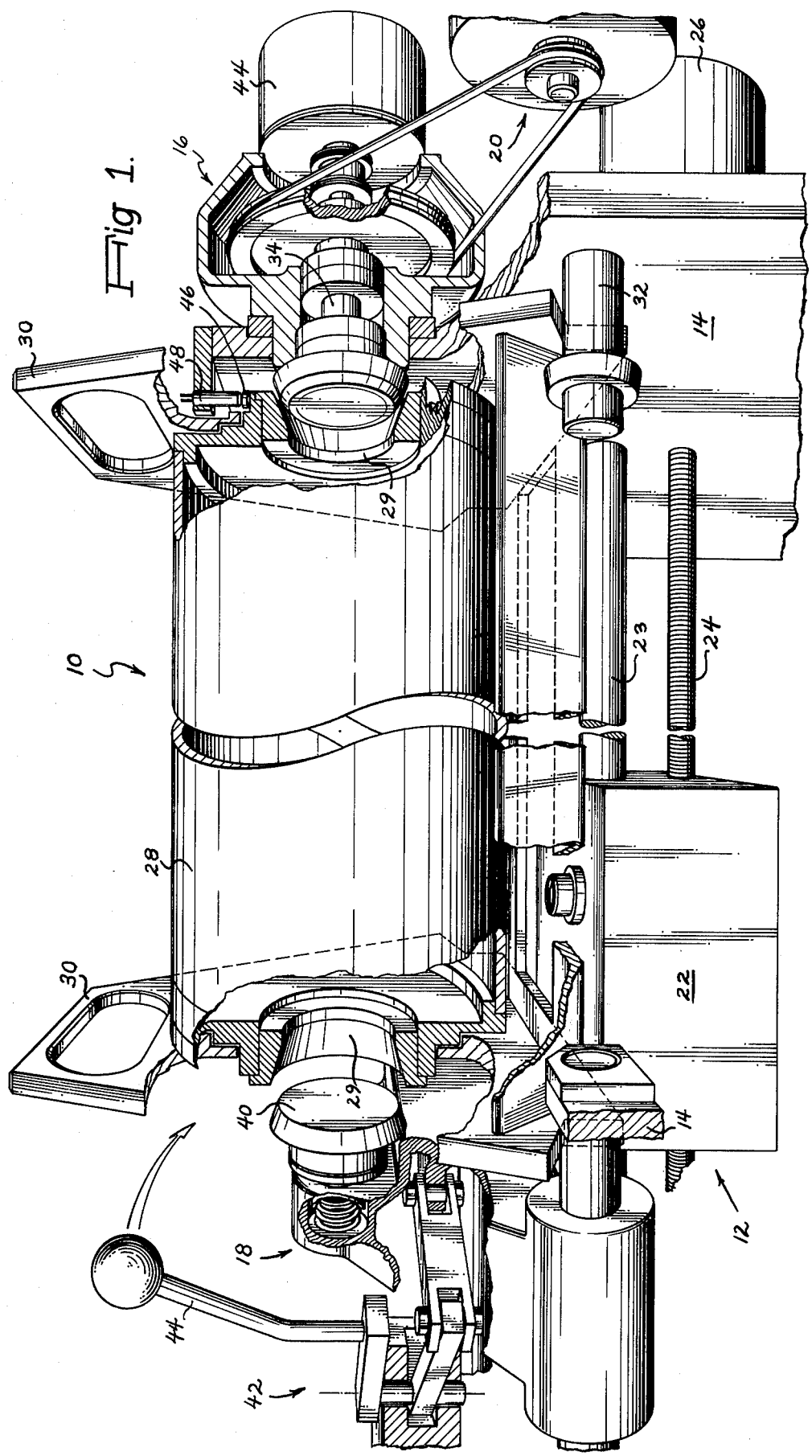

United States Patent [19]

Boston

[11] 4,024,518
[45] May 17, 1977

[54] METHOD AND APPARATUS FOR POSITION REFERENCING THE ROTATING DRUM OF A SCANNER/PLOTTER

[75] Inventor: William Thomas Boston, Melrose, Mass.

[73] Assignee: Optronics International, Inc., Chelmsford, Mass.

[22] Filed: Nov. 14, 1975

[21] Appl. No.: 632,166

[52] U.S. Cl. .............................. 340/206; 358/127
[51] Int. Cl.² ..................................... G08C 19/16
[58] Field of Search ........................... 340/204, 206

[56] References Cited

UNITED STATES PATENTS

| 784,393 | 3/1905 | Grabosch | 340/204 |
|---|---|---|---|
| 2,740,952 | 4/1956 | Jacobs | 340/206 |
| 2,770,798 | 11/1956 | Roth | 340/206 |
| 2,775,755 | 12/1956 | Sink | 340/206 |
| 2,970,302 | 1/1961 | Gridley | 340/206 |
| 3,261,007 | 7/1966 | Frisch | 340/206 |
| 3,262,105 | 7/1966 | Bell | 340/206 |
| 3,745,544 | 7/1973 | Ono | 340/206 |

*Primary Examiner*—Thomas B. Habecker
*Attorney, Agent, or Firm*—Richard J. Birch

[57] ABSTRACT

A method and apparatus are disclosed for referencing the position of a rotatable drum in a scanner/plotter. The rotatable drum is rotatable held in axial alignment by means of a drum headstock and a spring loader, moving center tailstock. An optical shaft encoder provides a reference pulse for the headstock drum shaft and a plurality of drive shaft position pulses. The rotatable drum has a magnetic pellet mounted thereon. A magnetic transducer is positioned with respect to the predetermined drive shaft position to detect the presence of the drum pellet. As the drum rotates, the transducer detects the pellet and produces an output signal which is used to electronically cross-reference the drum pellet to the predetermined drive shaft position.

6 Claims, 3 Drawing Figures

METHOD AND APPARATUS FOR POSITION REFERENCING THE ROTATING DRUM OF A SCANNER/PLOTTER

BACKGROUND OF THE INVENTION

The present invention relates to drum scanners and plotters generally, and more specifically, to a method and apparatus for position referencing a rotating drum in a scanner/plotter.

Drum scanners and photoplotters are well known in the image processing art. In order to accurately scan or photoplot in a drum scanner or plotter, the position of the drum must be accurately referenced to the optical axis of the scanner/plotter. The prior art has accomplished the requisite accurate position referencing of the drum by utilizing tight mechanical tolerances for the drum, the drum drive system and the scanner/plotter head. The use of tight mechanical tolerances is a satisfactory solution to the drum position referencing problem when the drum constitutes a substantially permanent part of the scanner/plotter. However, if the drum is frequently removed from the scanner for attachment of copy of for loading or unloading film, the use of tight mechanical tolerances imposes an undesirable cost burden on the scanner/plotter system.

It is accordingly a general object of the present invention to provide an improved method and apparatus for position referencing a rotating drum in a scanner/plotter.

It is a specific object of the invention to provide a method and apparatus for position referencing a rotating drum without requiring tight mechanical tolerances between the drum and the scanner/plotter.

It is another object of the invention to provide a position referencing system for a rotating drum which does not require the drum to be initially aligned with a reference element in the scanner/plotter.

It is a feature of the present invention that the apparatus can be implemented with readily available components.

It is another feature of the invention that the removable drum can be relatively inexpensively fabricated without requiring tight mechanical tolerances.

Figure 2:
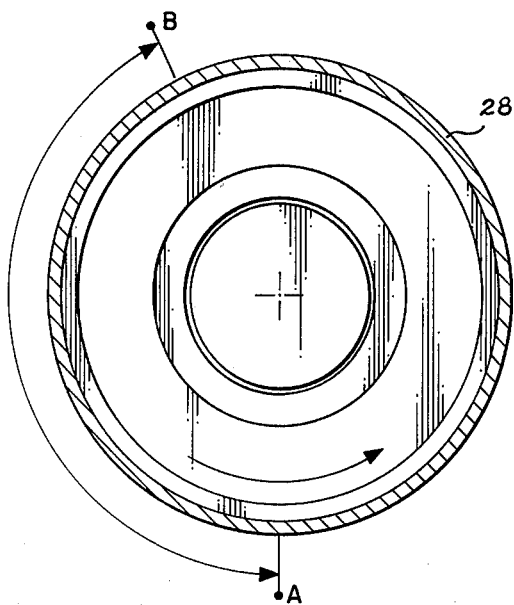
Figure 3:
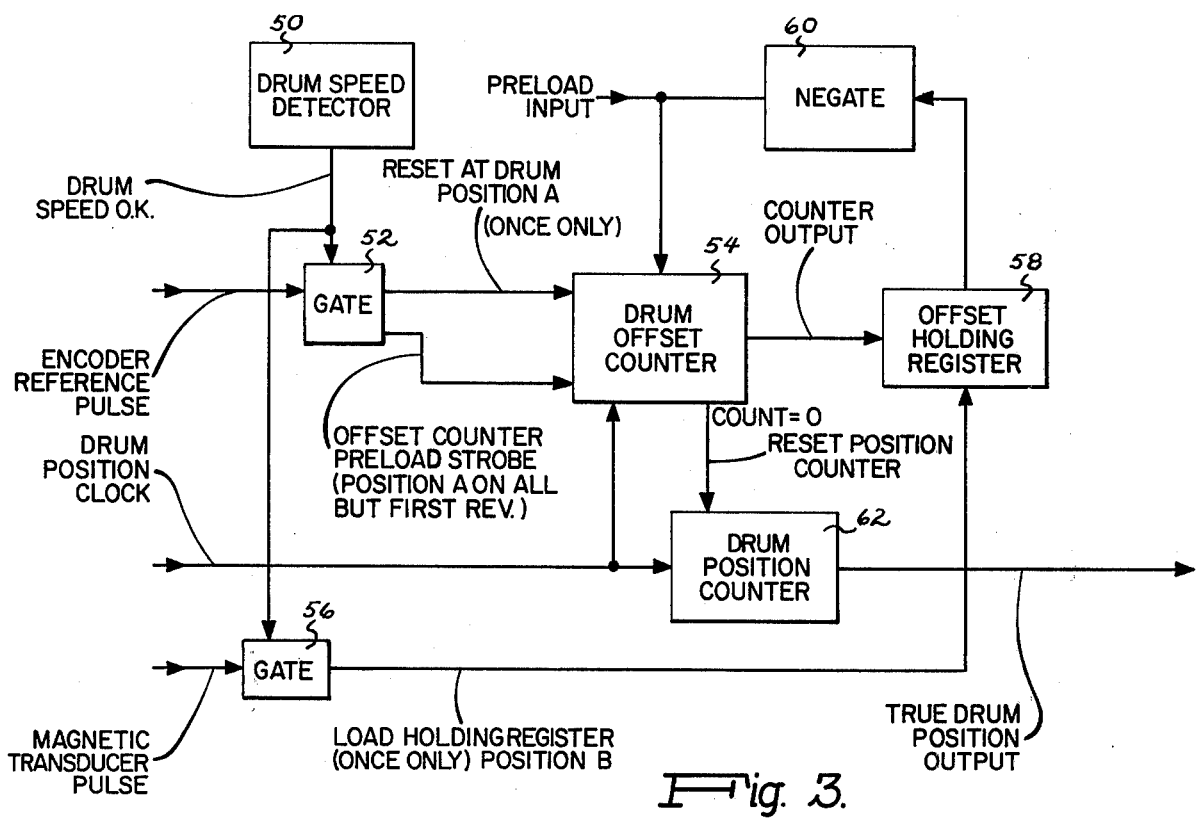

These objects and other objects and features of the present invention will best be understood from a detailed description of a preferred embodiment thereof, selected for purposes of illustration and shown in the accompanying drawings, in which:

FIG. 1 is a view in side elevation, partially broken away, showing a removable, rotatable drum mounted within a scanner/plotter FIG. 2 is a diagrammatic view showing the rotational, position relationship of the scanner/plotter shaft encoder zero position and the sensor for sensing the rotating drum fiducial; and, FIG. 3 is a diagram in block form showing the circuitry for processing the signals produced by the shaft encoder and the drum fiducial sensor to produce a true drum position output signal.

Turning now to the drawings and specifically to FIG. 1 thereof, there is shown a rotatable drum assembly, indicated generally by the reference numeral 10, positioned in a scanner/plotter which is indicated generally by the reference numeral 12. It will be appreciated that the major components of the scanner/plotter 12 are the same for both the scanning and plotting functions with the exception of the input and output means i.e. the scanner head and the plotter head. Accordingly, as used herein the term "scanner" should be construed to mean either a scanner or a plotter.

The major components of scanner 12 are illustrated in FIG. 1 The scanner has a base 14 upon which is mounted a headstock assembly indicated generally by the reference numeral 16, a tailstock assembly indicated generally by the reference numeral 18, drive means for the headstock assembly indicated generally by the reference numeral 20, a scanner head assembly 22 and a drive system for the scanner head assembly comprising optical rail 23, lead screw 24 and lead screw drive motor 26.

The drum assembly 10 comprises a rotatable drum or cassette 28 and a drum carrier 30. The drum 28 is rotatably mounted in carrier 30 and has at each end thereof a tapered conical aperture 29 which cooperates with the headstock and tailstock assemblies of the scanner 12 in a manner which will be described below. The axes of the tapered conical aperture 29 are coaxial with the axis of the drum 30.

When the drum assembly 10 is loaded into the scanner 12, as shown in FIG. 1, the lower portions of the carriers 30 rest on a drum rail 32 with the drum axis in approximate alignment with the scanner axis defined by the rotational centers of the head and and tailstock assemblies 16 and 18. Looking at the headstock assembly 16, the assembly includes a rotatably mounted drive shaft 34 which is driven by the headstock drive means 20. A truncated conical drive spindle 36 is mounted on drive shaft 34 for rotation therewith. The conical taper on the drive spindle corresponds to the taper of the conical aperture 29 on drum 28.

The tailstock assembly 18 is movably mounted on carrier rail 32 for axial movement towards the headstock assembly 18. The tailstock assembly 18 has a spring-loaded, conically tapered moving center element 40. The conical taper on the moving center element 40 corresponds to the conical taper on the drum aperture 29.

Axial movement of the tailstock assembly 16 is controlled by an actuator assembly 42. When handle 44 of the actuator assembly is moved in the direction shown by the arrow in FIG. 1, the tailstock assembly 18 moves in an axial direction towards the headstock assembly 16. The movable center element 40 of the tailstock engages the left hand (as viewed in FIG. 1) conical drum aperture and moves the drum to the right until the right hand tapered drum aperture is seated on the drive spindle 36. At this point, the drum 28 is axially aligned with the rotational axis of the drive spindle 36. The drum can now be rotated by actuating the headstock drive means 20.

The rotational position referencing of the rotating drum is accomplished by utilizing a plurality of rotationally referenced signals. An optical shaft encoder 44 located at the other end of drive shaft 34 produces a drive shaft reference pulse and a plurality of shaft clock pulses. The rotating drum 28 has a fiducial such as, a magnetic pellet 46. The presence of the pellet during rotation of the drum is detected by a magnetic transducer 48. The transducer produces an output pulse each time the pellet passes beneath the transducer.

Referring now to FIGS. 2 and 3, the point marked A in FIG. 2 corresponds to the position of the drum at the time of the shaft encoder reference pulse. The position marked B corresponds to the position of the magnetic transducer 48. The operating sequence of the rotating drum position referencing system of the present invention will now be described. The headstock drive means 20 is actuated to bring the drum 28 up to a predetermined speed which is sensed by a drum speed detector 50. When the drum reaches the predetermined speed, an output from drum speed detector 50 is inputted to gate 52. The other input to gate 52 is the shaft encoder reference pulse.

With the drum at speed, the first time thereafter that the drum reaches position A, the encoder reference pulse and drum speed signal cause gate 52 to reset a drum offset counter 54 to zero. The drum offset counter 54 then counts the shaft encoder pulses i.e. the drum position clock pulses until the drum is in position B at which point the transducer 48 produces a transducer output pulse. The magnetic transducer pulse is inputted to gate 56 together with the drum speed signal. The output from gate 56 causes the count in the drum offset counter 54 to be loaded into an offset holding register 58. When the drum is in position A on ensuing revolutions of the drum, the drum offset counter 54 is loaded with the negative contents of the offset holding register 58 through negate 60. The offset drum counter 54 increments the drum position clock pulses from the shaft encoder until the offset count is equal to zero. At this time, the drum offset counter 54 resets drum position counter 62. Thus, the drum position counter 62 is always referenced to the shaft encoder pulses.

Having described in detail a preferred embodiment of my invention, it will now be apparent to those skilled in the art that numerous modifications can be made therein without departing from the scope of the appended claims. For example, a variety of different types of drum fiducials can be employed to implement my invention. Instead of the described magnetic pellet and magnetic transducer, an optical fiducial and optical sensor can be used to generate the transducer reference pulses.

What I claim and desire to secure by Letters Patent of the United States is:

1. Apparatus for position referencing a rotating drum having thereon a fiducial, said apparatus comprising:
    1. drive means for rotating the drum about a rotational axis;
    2. means for generating a rotational reference signal at a predetermined rotational point about said axis of rotation;
    3. means for generating a plurality of rotational position signals representing a corresponding plurality of predetermined, rotationally spaced points about said axis of rotation;
    4. means positioned at a predetermined rotational point about said axis of rotation for detecting the presence of said drum fiducial at said point and for producing an output signal in response thereto; and
    5. means responsive to said reference signal, position signals and said output signal for producing a drum true position signal.

2. The apparatus of claim 1 wherein said drum has a tapered conical aperture at each end thereof and wherein said drive means includes a conically tapered driven spindle which cooperatively engages one of said drum apertures and a spring-loaded, conically tapered element which cooperatively engages the other one of said drum apertures whereby the drum is rotatably held in axial alignment with the center of revolution of said drive spindle.

3. The apparatus of claim 1 wherein said reference and position signal generating means comprises an optical shaft enccoder.

4. The apparatus of claim 1 wherein said drum fiducial is a magnet and said output signal producing means comprise a magnetic transducer.

5. The apparatus of claim 1 wherein said signal responsive means includes means for counting said position signals after the occurence of said reference signal, means for terminating the counting upon the occurence of the output signal and means for using said count as a count offset to subsequently counted position signal after the occurence of each subsequent reference signal.

6. A method for position referencing a rotating drum having thereon a fiducial, said method comprising the steps of:
    1. rotating the drum about a rotational axis.
    2. generating a rotational reference signal at a predetermined rotational point about said axis of rotation;
    3. generating a plurality of rotational position signals representing a corresponding plurality of predetermined, rotationally spaced points about said axis of rotation;
    4. detecting the presence of said drum fiducial at a predetermined rotational point about said axis of rotation and producing an output signal in response thereto; and
    5. processing said reference signal, position signals and said output signal to produce a drum true position signal.

* * * * *